(12) United States Patent
Gebotys

(10) Patent No.: US 7,848,514 B2
(45) Date of Patent: Dec. 7, 2010

(54) TABLE MASKING FOR RESISTANCE TO POWER ANALYSIS ATTACKS

(75) Inventor: Catherine Helen Gebotys, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 971 days.

(21) Appl. No.: 10/851,123

(22) Filed: May 24, 2004

(65) Prior Publication Data

US 2005/0259814 A1    Nov. 24, 2005

(51) Int. Cl.
*H04L 9/00* (2006.01)
*H04L 9/22* (2006.01)
*H04L 9/28* (2006.01)
*G06F 12/14* (2006.01)

(52) U.S. Cl. ............... 380/28; 380/42; 380/44; 380/268; 713/162; 713/168; 713/190

(58) Field of Classification Search ............ 713/189, 713/190; 380/22, 29, 37, 42, 268
See application file for complete search history.

(56) References Cited

U.S. PATENT DOCUMENTS

| 5,623,548 | A  | * | 4/1997  | Akiyama et al. ............ 380/28 |
| 6,278,783 | B1 | * | 8/2001  | Kocher et al. ............. 380/277 |
| 6,295,606 | B1 | * | 9/2001  | Messerges et al. ......... 713/189 |
| 6,658,569 | B1 |   | 12/2003 | Patarin et al. |

| 2003/0048903 | A1 | * | 3/2003 | Ito et al. .......... 380/263 |
| 2004/0028224 | A1 | * | 2/2004 | Liardet et al. ........ 380/37 |
| 2004/0071288 | A1 | * | 4/2004 | Romain et al. ........ 380/37 |

FOREIGN PATENT DOCUMENTS

EP    0 981 223 A2    2/2000
EP    1 267 514 A2    12/2002

OTHER PUBLICATIONS

Golic et al Multiplicative Masking and Power Analysis of AES, Oct. 30-31, 2001, CHES 2202, LNCS 2523, pp. 198-212.*
Itoh et al , DPA Countermeasure Based on the"Masking Method",ICICS 2001, LNCS 2288, pp. 440-456, 2002.*
Kouichi Itoh, Masahiko Takenaka, and Naoya Torii, DPA Contermeasure Based on the "Masking Method", Springer-Verlag Berlin Heidelberg, ICICS 2001 LNCS 2288, pp. 440-456, 2002, Springer-Verlag Berlin Heidelberg 2002.*

(Continued)

*Primary Examiner*—David García Cervetti
*Assistant Examiner*—Fatoumata Traore
(74) *Attorney, Agent, or Firm*—Etienne de Villiers; Dimock Stratton LLP

(57) ABSTRACT

Tables are defined to permit output masking for table look-ups to be carried out to resist power analysis attacks on cryptographic operations. A set of individually defined random values is used to mask each entry in a substitution table, defining a masked substitution table. A mask table is also defined such that the values of each entry, masked with the corresponding random value, is the value of a fixed mask. The masked substitution tables and the mask tables may be used in cryptographic operations to permit the output of table look-ups to be masked, without directly using the fixed mask value in the computations of the cryptographic operations.

26 Claims, 5 Drawing Sheets

OTHER PUBLICATIONS (Mehdi-Laurent Akkar and Christophe Giraud, An Implementation of DES and AES, Secure against Some Attacks, CHES 2001, LNCS 2162, pp. 309-318, 2001, Springer-Verlag Berlin Heidelberg 2001.*

Kocher et al., "Differential Power Analysis" CRYPTO'99, Lecture Notes in Computer Science, 1666, p. 388-397, Springer-Verlag 1999.

Messerges, "Securing the AES Finalists Against Power Analysis Attacks", FSE 2000, Lecture Notes in Computer Science, 1978, p. 150-164, Springer-Verlag 2001.

Itoh et al., "DPA Countermeasure Based on the 'Masking Method'", ICICS 2001, Lecture Notes in Computer Science, 2288, p. 440-456, Springer-Verlag 2001.

* cited by examiner

TABLE MASKING FOR RESISTANCE TO POWER ANALYSIS ATTACKS

FIELD OF THE INVENTION

This invention relates generally to computing systems and, more particularly, to computing systems implementing encryption operations and countermeasures to resist power analysis attacks on such operations.

BACKGROUND OF THE INVENTION

Computing systems often require operations to be carried out in a secure manner. For embedded computing devices and for pervasive systems, security of operation is often crucial. To ensure operations and communications are secure, such systems employ cryptographic methods.

The implementation of such a cryptographic method must itself be secure. However, cryptographic methods are subject to attacks. One type of non-invasive attack on computing devices implementing cryptographic methods is known as a power analysis attack. A power analysis attack involves the monitoring of the power consumption of one or more components of a device while the device executes a cryptographic method.

The data derived from monitoring power consumption of the device, combined with knowledge of the operations being carried out by the device, are used to derive the secret information that is part of the cryptographic method.

One type of power analysis attack is known as a Differential Power Analysis ("DPA") (see, for example, "Differential Power Analysis" P. Kocher, CRYPTO'99, Lecture Notes in Computer Science, 1666, pp. 388-397, 1999, Springer-Verlag). This approach involves generating a large number of inputs by varying different bits in values to be encoded using the cryptographic method implemented in a device. The DPA attack monitors power consumption at different points in a computing device for each of these varying values and, by statistical analysis, the differential data is used to determine a likely key value for the cryptographic method (the secret information).

The DPA attack often targets the output of Substitution tables (also referred to as substitution boxes or "S-boxes") that are common in cryptographic algorithms and are often implemented as look up tables. An S-box is typically indexed by a combination of key bits and plaintext. In carrying out an attack to determine a key value used in a cryptographic system, an attacker controls the plaintext values and makes guesses at the key bits. Based on these guesses, computations are performed on the acquired power traces to form a set of DPA data. The DPA data with the largest peak value is used to determine which of the key bit guesses was likely correct.

There are several known countermeasures for this S-box DPA attack. Messerges 2000 ("Securing the AES Finalists Against Power Analysis Attacks" T. Messerges, FSE 2000, Lecture Notes in Computer Science, 1978, pp. 150-164, 2001, Springer-Verlag) identifies a method of frequently regenerating tables with a different random output mask within the cryptographic algorithm. However, such an approach includes a potentially large overhead cost for each regeneration step. To improve the latency overhead required to regenerate the tables, Itoh 2001 ("DPA countermeasure based on the 'masking method'" K. Itoh et al., ICICS 2001, Lecture Notes in Computer Science, 2288, pp. 440-456, 2001, Springer-Verlag) suggests using a fixed number of fixed values to mask the substitution tables. Different substitution tables may be pre-defined and the different tables used at different times in the cryptographic system. However, since the mask values for each such table do not change in the Itoh approach, there is a threat that over time an attacker may determine the mask values used. Further, there is a potential for an attacker to obtain information by using simple power analysis to identify when the masked table is changed.

A further approach involves the duplication method described in Patarin (U.S. Pat. No. 6,658,569, Patarin et al., "Secret key cryptographic process for protecting a computer system against attacks by physical analysis") that targets secret sharing schemes where multiple inputs to the S-box are supported. The multiple inputs to the table are transformed into a variable v. Additionally two table outputs are produced one which is a random transformation on the input, A(v), and another which is A(v) exclusive-or'd with S(v). However, since the random transformation on v does not change in the Patarin approach, there is a threat that over time an attacker may determine the random transformation used. Furthermore, since A(v) is output from the table, there is a potential for an attacker to obtain information by using second order power analysis (using power samples of A(v) and A(v) exclusive-or'd with S(v)) to obtain a correct key guess.

It is therefore desirable to be able to implement masking countermeasures that will resist a DPA attack using mask values and that will not require repeated power consuming table regenerations.

SUMMARY OF THE INVENTION

According to an aspect of this invention there is provided an improved countermeasure for a cryptographic process or system.

According to a further aspect of this invention, there is provided a method and system for individually defining random values to be used for masks of entries in substitution tables used in a cryptographic operations to define masked substitution tables. Corresponding mask tables are defined to permit an effective masking of output values in cryptographic operations. In accordance with other aspects of the invention, such masked substitution tables and mask tables may be used in cryptographic operations carried out in accordance with the AES (Advanced Encryption Standard) and DES (Data Encryption Standard) approaches known to those in the art.

In accordance with another aspect of the invention there is provided a computing device-implemented method for obtaining one or more masked output values from cryptographic operations defined with reference to one or more substitution tables, the output values being equivalent to values masked with the fixed mask value m, the method including the steps of individually generating a random value r[x] for each address x in the one or more substitution tables, defining one or more masked substitution tables by masking each value in the substitution tables at address x with the corresponding value r[x], defining one or more mask tables corresponding to the masked substitution tables such that each value at an address x, when masked with the corresponding value r[x], is equal to the fixed mask value m.

In accordance with another aspect of the invention there is provided a computing device-implemented method for obtaining one or more masked output values from cryptographic operations defined with reference to one or more substitution tables, the output values being equivalent to values masked with the fixed mask value m, the method including the steps of individually generating a random value r[x] for each address x in the one or more substitution tables, defining one or more masked substitution tables by masking each value in the substitution tables at address x with the corresponding value r[x], individually generating random values r1[x] ... rn−1[x] for each address x in the one or more substitution tables and defining one or more sets of masked substitution tables M1 ... Mn−1 to store the random values r1[x] ... rn−1[x], defining one or more mask tables Mn having entries rn[x] corresponding to the masked substitution tables such that rn[x]=m^r[x]^r1[x]^...^rn−1[x].

In accordance with another aspect of the invention there is provided a computing device-implemented method to mask table output values for an AES cryptographic operation, the method including carrying out first AES cryptographic steps on a set of masked substitution tables and carrying out second AES cryptographic steps on a set of mask tables, the values resulting from the first and the second AES cryptographic steps being combined to provide masked output values.

In accordance with another aspect of the invention there is provided a computing device-implemented method to mask table output values for an AES cryptographic operation, the method including the steps of defining a set of masked substitution tables and a set of mask tables as set out in above and the method including carrying out first AES cryptographic steps on the set of masked substitution tables and carrying out second AES cryptographic steps on the set of mask tables, the values resulting from the first and the second AES cryptographic steps being combined to provide masked output values.

In accordance with another aspect of the invention there is provided a computing device-implemented method to mask table output values for DES encryption operations, the method including the steps of carrying out a first set of DES cryptographic steps on a set of masked substitution tables and carrying out a second set of DES cryptographic steps a set of mask tables, intermediate results from steps in the first set and in the second set of DES cryptographic steps being masked with intermediate results of the corresponding step in the other set of DES cryptographic steps so as to be used as inputs for succeeding steps, the values resulting from the first and the second sets of DES cryptographic steps being combined to provide masked table output values.

In accordance with another aspect of the invention there is provided a computing device-implemented method to mask table output values for a DES cryptographic operation, the method including the steps of defining a set of masked substitution tables and a set of mask tables as set out above and the method including the steps of carrying out a first set of DES cryptographic steps on a set of masked substitution tables and carrying out a second set of DES cryptographic steps a set of mask tables, intermediate results from steps in the first set and in the second set of DES cryptographic steps being masked with intermediate results of the corresponding step in the other set of DES cryptographic steps so as to be used as inputs for succeeding steps, the values resulting from the first and the second sets of DES cryptographic steps being combined to provide masked table output values.

In accordance with another aspect of the invention there is provided the above computing device-implemented methods further including the steps of dynamically regenerating each corresponding masked substitution table and mask table by, after a predetermined number of table entries are accessed, redefining each of the accessed entries in the corresponding tables by masking the entry in each of the tables with an individually generated random value.

In accordance with another aspect of the invention there is provided the above computing device-implemented methods in which the steps of defining the masked substitution tables and the mask tables are carried out prior to a step of downloading program code for carrying out the further cryptographic steps.

In accordance with another aspect of the invention there is provided a system for obtaining one or more masked output values from cryptographic operations, using or more of the above methods.

In accordance with another aspect of the invention there is provided a computing-device program product for obtaining one or more masked output values from cryptographic operations using one or more of the above methods.

Advantages of the invention include the software implementation of countermeasures for differential power analysis security attacks that require limited overhead costs in energy, performance and program code. Such limited overhead permits the use of this countermeasure approach with devices such as wireless hand-held communication devices where security is required for the operations carried out by the devices but in which constraints on power and processor performance are potential concerns.

BRIEF DESCRIPTION OF THE DRAWINGS

In drawings which illustrate by way of example only a preferred embodiment of the invention.

DETAILED DESCRIPTION OF THE INVENTION

In different cryptographic operations implemented in computing devices, substitution tables are used. For example in AES and 3DES, multiple S-boxes are utilized in encryption of plaintext. To provide countermeasures for security attacks on such cryptographic operations the output of such substitution tables may be masked. The security provided by such a masking of the table output may, however, itself be subject to attack.

The preferred embodiment may be implemented as a computer program product that includes program code that operates to carry out the steps in the process described. The preferred embodiment may be implemented as a computer system (which includes a subsystem or system defined to work in conjunction with other systems) for encryption that includes elements that execute the functions as described. The computer system of the preferred embodiment may be defined by, and the computer program product may be embodied in, non-transitory storage media such as magnetic, electronic or optical storage media.

The preferred embodiment is described with reference to encryption steps. However, it will be appreciated that the preferred embodiment may be implemented with respect to decryption processes, also.

It will be appreciated by those skilled in the art that the masking referred to in the description of the preferred embodiment is carried out by the use of a bit-wise exclusive-or operation (XOR) with respect to different values expressed in a binary format. However, other masking operations may be used. For example arithmetic masking (involving the use of addition and/or subtraction in place of the exclusive-or operation) may also be used.

Figure 1:
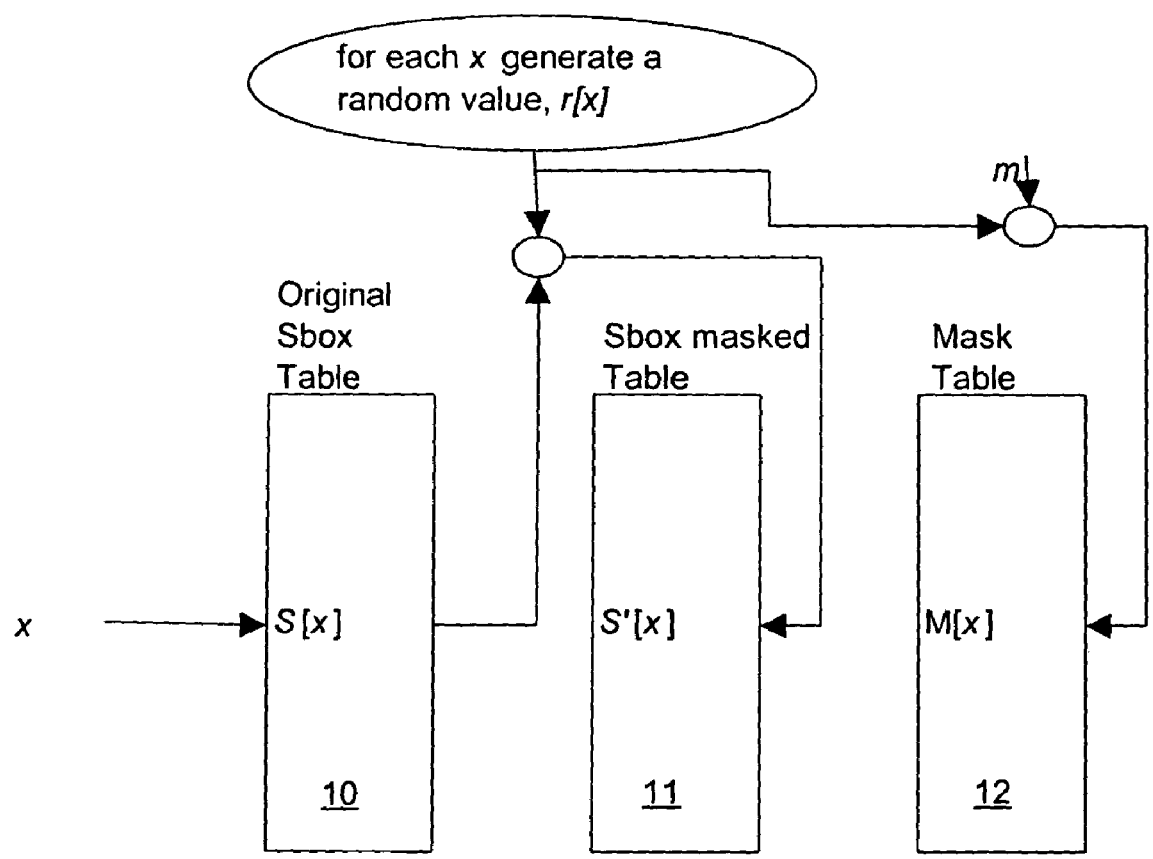
FIG. 1 is a block diagram showing tables in accordance with the preferred embodiment.

According to the preferred embodiment, full random masking of table outputs is supported. FIG. 1 is a block diagram that shows a generalized example of the preferred embodiment including substitution table 10, masked substitution table 11, and mask table 12. In the preferred embodiment, substitution table 10 is also referred to as an S-box, and masked substitution table 11 is also referred to as a masked S-box. It will be understood that such tables as used in cryptographic operations are linear/non-linear transforms of the form $y=T[x]$, where $T[\ ]$ is a transformation. The tables referred to in the description of the preferred embodiment carry out non-linear transformations of input values by reading values at addresses in the tables, these addresses being functions of the input values. The read values are output values for the tables. Substitution table 10 is a typical substitution table implemented in the preferred embodiment as a lookup table in which the index into the table (the input value) is represented as the variable x. Although the address that is looked up in the table may be a function of the variable x, in the preferred embodiment the look up is a direct one—the input value is mapped directly to an address in the substitution table.

According to the preferred embodiment, each entry in substitution table 10 is masked by an individually generated random value to yield masked substitution table 11. As shown in FIG. 1, each entry in substitution table 10 is represented as $S[x]$. The mask for each entry in substitution table 10 is a random value: for entry $S[x]$, the masking random value is denoted $r[x]$. As shown in FIG. 1, the result of masking $S[x]$ with the value $r[x]$ is the value $S'[x]$ in masked substitution table 11. In FIG. 1, as in the other figures, a masking operation (a bit-wise exclusive-or operation in the preferred embodiment) is shown by a small circle or oval.

As indicated, in the preferred embodiment, a random value $r[x]$ is generated for each index x in substitution table 10. It will be appreciated by those skilled in the art that pseudo-random values will also work with the preferred embodiment. The $r[x]$ values are denoted as if they appear in a table, however, as described below, the values can also be generated as they are needed for individual index values in substitution table 10.

As referred to above, in the preferred embodiment, each $r[x]$ random value is bitwise exclusive-or'd with the value $S[x]$ and the result stored in the position in the masked substitution table 11 for the index x. In this way, in accordance with the preferred embodiment, masked substitution table 11 is defined for each x as follows:

$$S'[x]=S[x]\char`\^r[x]$$

In the preferred embodiment, $r[x]$ is the random mask for each entry in substitution table 10 and $r[x]$ is a function of the table address, x. Previous approaches to masking the output of a substitution table (S-box) used a constant mask, r1, for all data in the table and when a new random masking was required, it was necessary to regenerate the whole table to utilize the next new random value mask, r2. As will be set out below, the approach of the preferred embodiment does not require a complete regeneration of the entire masked substitution table 11 to utilize a new random mask value for an entry in the table. The fact that there is no requirement to regenerate the entire table means that the countermeasure is suitable for use in devices that are constrained in the power available for cryptographic processing. For example, the method of the preferred embodiment is useful in cryptographic functions carried out in wireless handheld devices.

In the preferred embodiment, a second corresponding table, mask table 12 in FIG. 1, is used to store a corresponding mask for each address in substitution table 10. This mask table 12 is defined such that the exclusive-or of the masked S-box (table 11) and the mask table (table 12) is a fixed masked value. This relationship of the mask table with a fixed masked value may be denoted $m=r[x]\char`\^M[x]$, for all x. As is indicated in FIG. 1, a random value m is generated once for substitution table 10. Each entry in mask table 12 is thus defined such that the bit-wise exclusive-or of the entry with the random value $r[x]$ is the value m.

As will be appreciated, in the preferred embodiment masked substitution table 11 and mask table 12 are the same size as substitution table 10, and each produces output having the same size (the same number of bits).

The approach of the preferred embodiment permits cryptographic operations to be carried out such that the masking value m does not need to be computed during the execution of the operations. The respective definitions of masked substitution table 11 and mask table 12 are usable by cryptographic operations such that the output of the original substitution table is masked with a fixed mask, without the fixed mask being directly computed. This is possible because due to the definitions of the tables, the following identity is true: $S[x]\char`\^r[x]\char`\^M[x]=m\char`\^S[x]$. As set out above, $S'[x]=S[x]\char`\^r[x]$ and therefore by a cryptographic operation utilizing masked substitution table 11 and mask table 12, a result equivalent to that achieved by using a mask on the output of substitution table 10 may be achieved without directly using the masking value m in the cryptographic operation.

As indicated, to avoid a first order DPA attack, the exclusive-or of the masked S-box and mask table, $S[x]\char`\^r[x]\char`\^M[x]=m\char`\^S[x]$ or m is never computed during the execution of the cryptographic process.

According to the preferred embodiment, on each access of masked substitution table 11 and mask table 12, the masking is refreshed. Because the relationship between the table values $S'[x]$ and $M[x]$ are fixed by their initial definition, these pairs of values may be changed by applying the same randomly defined value, without altering the way in which the tables themselves may be used. Thus, in the preferred embodiment, a new random value r is generated for each table access and the value $S'[x]\char`\^r$ and $M[x]\char`\^r$ are used to replace values $S'[x]$ and $M[x]$, respectively.

Figure 2:
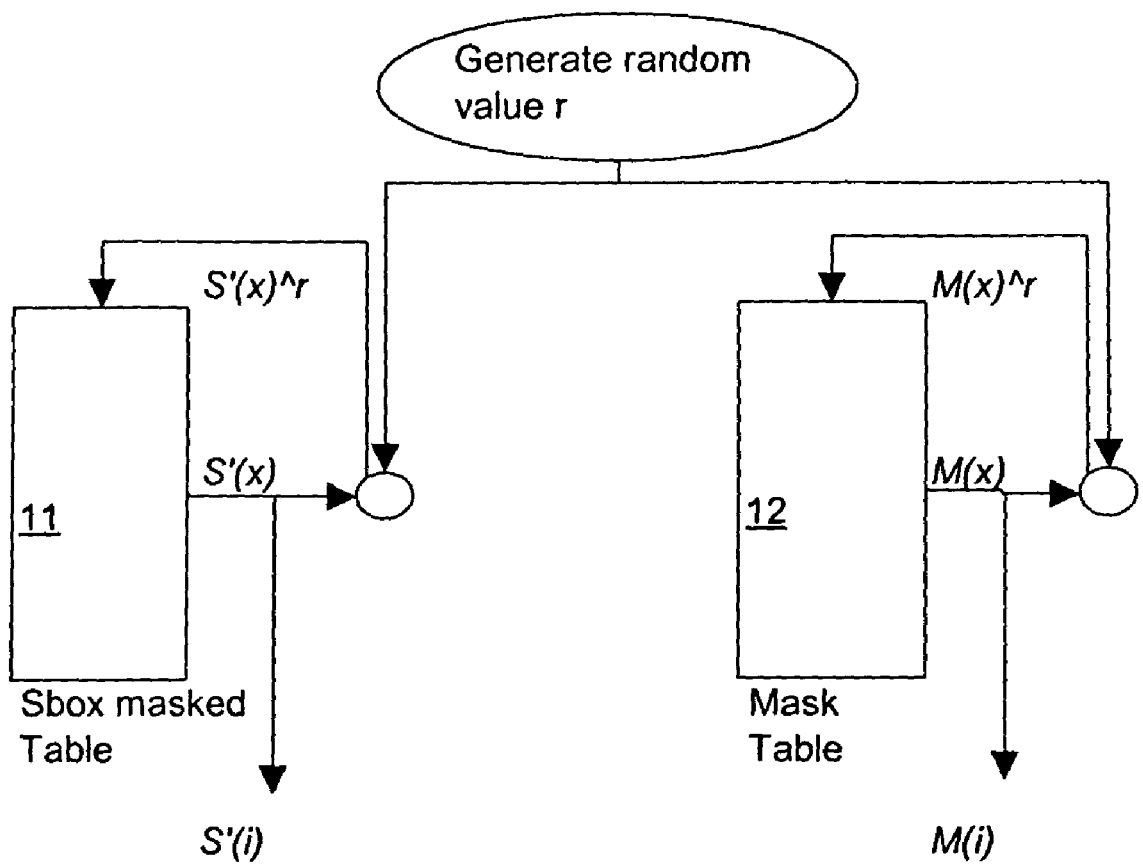
FIG. 2 is a block diagram showing masking of table entries in accordance with the preferred embodiment.

This replacement is shown in the block diagram of FIG. 2. Masked substitution table 11 is shown with replacement value $S'[x]\char`\^r$ being placed in the table following the generation of the random value r after an access of the table. The similar substitution of $M[x]\char`\^r$ for $M[x]$ is shown for mask table 12. In this manner, the masking of the table values is dynamically updated without requiring a regeneration of an entire table. In the preferred embodiment such dynamic updating takes place whenever an entry in the tables is accessed. A more general approach is to update the tables in the same manner but only after a predefined number of accesses has taken place. This number may be defined to be 1, in which case the updating will occur on every access, as in the preferred embodiment.

As will be appreciated by those skilled in the art, a second order DPA attack may possibly be made on the masking as described above with reference to FIG. 1. The approach of the preferred embodiment shown in FIG. 1 may, however, be extended to permit masking of substitution tables using a set of mask tables, rather the single mask table 12 shown in the example of FIG. 1. The definition of the set of n mask tables requires an (n+1)th order DPA attack to seek to obtain key or mask values for the tables used in the cryptographic operations.

Figure 3:
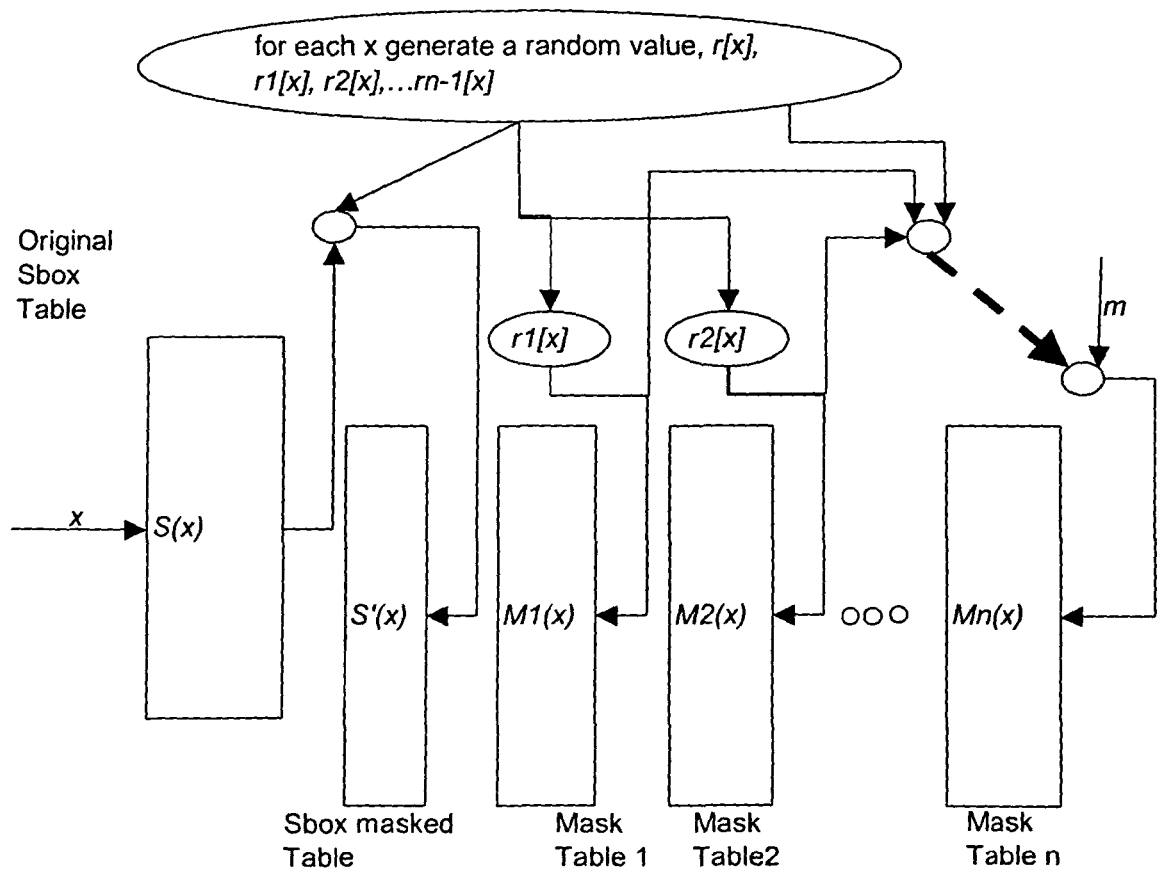
FIG. 3 is a block diagram showing a substitution table, a masked substitution table and a series of mask tables, in accordance with an implementation of the preferred embodiment.

FIG. 3 shows the relationship of the different mask tables. In the example of FIG. 3, substitution table 10 and masked substitution table 11 are defined as in the example of FIG. 1. However, for each x, a set of random values $r[x], r_1[x], \ldots r_{n-1}[x]$ are defined. As is shown in FIG. 3, mask tables $M_1[x], \ldots M_{n-1}[x]$ are defined to store the random values $r_1[x], \ldots r_{n-1}[x]$ respectively (after generation, the random values are stored in the set of mask tables). Mask table $M_n[x]$ is defined such that $r_n[x] = m \hat{\ } r[x] \hat{\ } r_1[x] \hat{\ } \ldots \hat{\ } r_{n-1}[x]$. As a result, the identity $$S[x]\hat{\ }r[x]\hat{\ }r_1[x]\hat{\ }\ldots\hat{\ }r_n[x]=m\hat{\ }S[x]$$

applies and, as was the case with the example of FIG. 1, the table values defined as shown in FIG. 3 may be used to effectively provide output value masking for substitution table 10, without calculating the value m.

According to the preferred embodiment, the definition of masked substitution table 11 and of mask table 12 may take place, for example, in a computing device at a point prior to the implementation of cryptographic operations that are to utilize the tables. In this manner, it is possible to define the tables on a computing device in a secure environment and to later download the particular program code that will cause cryptographic operations to be carried out on the device. Because the original definition of the table is computed only once, the value m is used to pre-compute tables before cryptographic code is downloaded to the device.

The preferred embodiment may be applied to different cryptographic operations where output masking of tables is required. The tables of the preferred embodiment are typically used in a pair-wise fashion, with cryptographic operations carried out with respect to the masked substitution tables being similarly carried out with respect to the corresponding mask tables. A final masking step combines the values derived from the masked substitution tables and the mask tables. In this way the output mask applied to the table is not directly computed during the cryptographic operations but the result is effectively masked by the pre-defined mask value. As indicated above, the appropriate substitution tables and related mask values may be pre-computed to ensure the value of m is maintained securely.

Figure 4:
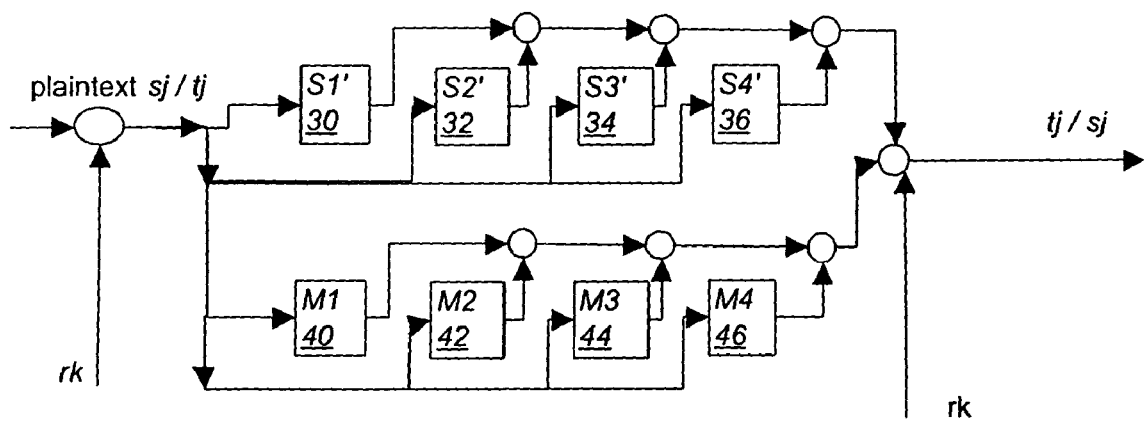
FIG. 4 is a block diagram showing masked substitution tables and mask tables used in an AES operation in accordance with the preferred embodiment.

The application of the approach of the preferred embodiment to the AES cryptographic operations is shown in FIG. 4. FIG. 4 shows the use of a single mask table (the AES algorithm includes four sub-tables and FIG. 4 thus shows the single mask table in four sub-tables). The block diagram of FIG. 4 shows two parallel sets of computations: the upper series of masked substitution tables 30, 32, 34, 36 are used in one set of computations, and the lower series of mask tables 40, 42, 44, 46 is used in the other. As may be observed, the set of masked substitution tables 30, 32, 34, 36 are used in the same manner that an S-box would be used in the typical AES method. Round key rk is shown as being applied to plaintext to generate sj/tj in FIG. 4, and also at the output. Mask tables 40, 42, 44, 46 are utilized in the same way as are the masked substitution tables. The results of the operations on the masked substitution tables and on the mask tables, however, are combined by an exclusive-or operation (as illustrated in FIG. 4). The result is the masking of the AES output value by the value m, without that value being directly used in the different steps in the cryptographic operation.

In the example of FIG. 4, mask table 40 may be related to masked substitution table 30 by random values r[x] that differ from the set of random values used to define the other pairs of masked substitution tables and mask tables (for example, mask table 42 and masked substitution table 32). In an alternative implementation, a single mask table could be used for all four S-boxes (tables 30, 32, 34, 36). In such a case, the same random value at address x is used for all S-boxes, requiring tables $S1'[x]=S1[x]\hat{\ }r[x]$, $S2'[x]=S2[x]\hat{\ }r[x]$, $S3'[x]=S3[x]\hat{\ }r[x]$, $S4'[x]=S4[x]\hat{\ }r[x]$, and $M[x]$ where $M[x]\hat{\ }r[x]=m$). Another implementation includes one or more sets of mask tables, as described above with reference to FIG. 3, which sets of mask tables are used for each of the S-boxes, or alternatively a subset.

Figure 5:
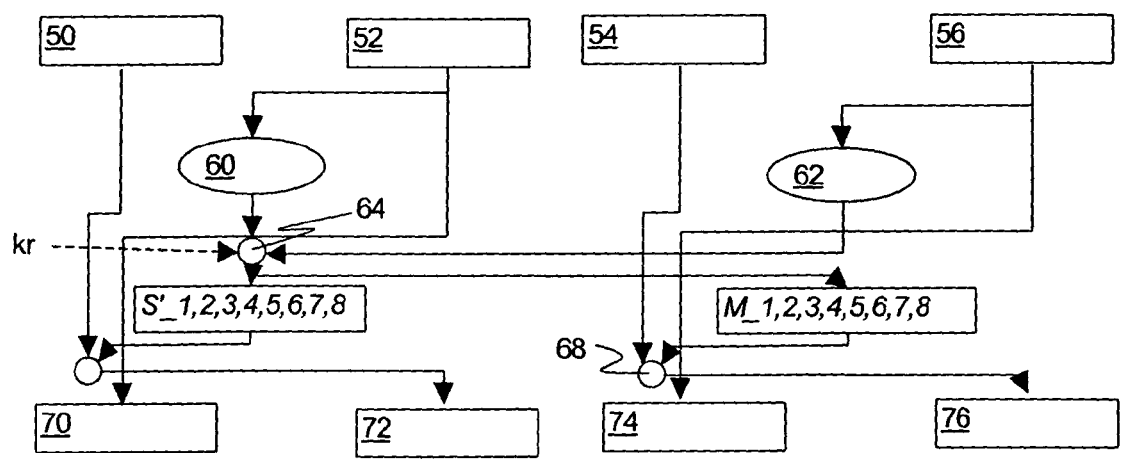
FIG. 5 is a block diagram showing masked substitution tables and mask tables used in an example round of a DES operation in accordance with the preferred embodiment.

A similar use of sets of related tables (masked substitution tables and mask tables) is possible in a DES encryption operation. An example of such a use is shown in the block diagram of FIG. 5. In FIG. 5, an example of round r of the DES mechanism, as modified to include the tables of the preferred embodiment, is shown. FIG. 5 shows two interrelated sets of tables. FIG. 5 abbreviates the table representations such that "S'_1,2,3,4,5,6,7,8" represents a set of eight masked substitution tables. In FIG. 5 a set of related mask tables, defined in accordance with the preferred embodiment as indicated above, is also shown and is represented "M_1,2,3,4,5,6,7,8". Each of the two sets of tables are subject to the typical DES operations. FIG. 5 shows the movement of data for an example round r in the modified DES encryption. As in the usual DES steps, there are two data sets. In the modified approach, DES steps carried out on the masked substitution tables are mirrored with steps carried out on the mask tables. Thus inputs 50, 52 for steps with respect to tables S'_1,2,3,4,5,6,7,8 are mirrored by inputs 54, 56 for steps with respect to tables M_1,2,3,4,5,6,7,8. For both sets of inputs, expansion permutations are carried out: shown in ovals 60, 62 in FIG. 5, respectively. FIG. 5 shows the round key, denoted kr, being exclusive-or'd with the output of both the expansion permutations 60, 62. The resulting values are used as input for both the masked substitution tables and for the mask tables. The results of these table look-ups are then subject to the exclusive-or operations 66, 68, respectively, in accordance with the DES approach. The results are part of the output set 70, 72, 74, 76 as shown in FIG. 5.

At the conclusion of the DES rounds, the results of both the masked substitution table steps and the mask table steps are exclusive-or'd in the appropriate manner and the results are then input to the final permutation to provide the desired result of the DES operation (encryption or decryption, as the case may be). The use of the masked substitution tables and the mask tables permits table look-up output values to be effectively masked, without using the mask value directly in the computations of the DES operations.

FIG. 5 shows 8 mask tables associated with the 8 masked substitution tables defined in accordance with the DES algorithm. As was the case with the implementation of the preferred embodiment with respect to the AES cryptographic process referred to above, an alternative implementation provides that instead of 8 mask tables (one for each of the 8 masked substitution tables, as is denoted in FIG. 5), it is possible to use a single mask table for all 8 masked substitution tables (requiring the same r[x] vector to be used in all 8 tables). Furthermore a set of several mask tables may be used for all masked substitution tables, or a subset, thus requiring a higher order DPA attack to make the cryptographic operations insecure. Where a single set of several mask tables is used for all masked substitution tables, the set will have the same r[x] vector for all 8 tables. Where there are multiple sets of mask tables, different r[x] vectors are used for each of masked substitution tables that are associated with different sets of mask tables.

The preferred embodiment is described having masked substitution tables and corresponding mask tables that are potentially unchanging or that are dynamically updated by masking entries in such tables after entry access. It will also be understood that the tables may be regenerated for each cryptographic operation, if this overhead cost is able to be borne by the device and the application utilizing the cryptographic operation. Alternatively, a number of sets of masked substitution tables and mask tables may be pre-computed and the different sets may be used for differing cryptographic operations.

Various embodiments of the present invention having been thus described in detail by way of example, it will be apparent to those skilled in the art that variations and modifications may be made without departing from the invention. The invention includes all such variations and modifications as fall within the scope of the appended claims.

I claim:

1. A computing device-implemented method to resist power analysis attacks on a computing device by executing cryptographic steps based on a defined cryptographic process, the defined cryptographic process accepting an input, generating an output, and utilizing one or more originally-defined substitution tables, the method comprising a processor of the computing device, in communication with a memory, executing the cryptographic steps:
   a) individually generating a random value r[x] for each address x in the substitution table,
   b) masking a value in the substitution table, at each address x, with the random value r[x] generated for the address x to define the masked substitution table, and
   c) defining the corresponding mask table such that the value at each address x in the corresponding mask table, when masked with the random value r[x] generated for that address in the masked substitution table, is equal to a fixed mask value m.

2. The method of claim 1 further comprising the processor dynamically regenerating the masked substitution table and the corresponding mask table by, after a predetermined number of masked substitution table entries are accessed, masking each of the accessed entries and a respective entry in the corresponding mask table with an individually generated random value.

3. The method of claim 1 wherein masking a value in the substitution table at each address x further comprises the processor storing at address x in the masked substitution table the value in the substitution table at address x as masked by the corresponding value r[x].

4. The method of claim 1 wherein defining the corresponding mask table further comprises the processor storing at address x in the corresponding mask table the value when masked with the corresponding value r[x] generated for that address in the masked substitution table, is equal to the fixed mask value m.

5. A computing device-implemented method to resist power analysis attacks on a computing device by executing cryptographic steps based on a defined cryptographic process, the defined cryptographic process accepting an input, generating an output, and utilizing one or more originally-defined substitution tables, the method comprising a processor of the computing device, in communication with a memory, executing the cryptographic steps:
   a) individually generating a random value r[x] for each address x in the substitution table,
   b) masking a value in the substitution table, at each address x, with the random value r[x] generated for the address x to define the masked substitution table,
   c) generating random values $r_1[x], \ldots, r_{n-1}[x]$ for each address x in the substitution table and defining mask tables $M_1, \ldots, M_{n-1}$ to store, at each address x therein, the respective random values $r_1[x], \ldots, r_{n-1}[x]$, and
   d) defining a mask table $M_n$ by, for each address x in the mask table $M_n$, masking a fixed mask value m with the random value r[x] generated for the address x in the masked substitution table and with each of the random values $r_1[x], \ldots, r_{n-1}[x]$ stored at the address x in the respective mask tables $M_1, \ldots, M_{n-1}$.

6. The method of claim 5 further comprising:
   the processor dynamically regenerating each masked substitution table and each corresponding mask table by, after a predetermined number of masked substitution table entries are accessed, masking each of the accessed entries and a respective entry in each corresponding mask table with an individually generated random value.

7. A computing device-implemented method to resist power analysis attacks on a computing device by executing cryptographic steps based on a defined cryptographic process, the defined cryptographic process accepting an input, generating an output, and utilizing one or more originally-defined substitution tables, the method comprising a processor of the computing device, in communication with a memory, executing the cryptographic steps:
   i) defining a set of masked substitution tables and a set of corresponding mask tables by, for each substitution table from a set of substitution tables;
      (a) individually generating a random value r[x] for each address x in the substitution table,
      (b) masking a value in the substitution table, at each address x, with the random value r[x] generated for the address x to define a masked substitution table corresponding to the substitution table, and
      (c) defining a corresponding mask table for the masked substitution table such that a value at each address x in the corresponding mask table, when masked with the random value r[x] generated for the address x in the masked substitution table, is equal to a fixed mask value m,
   ii) carrying out a first cryptographic operation utilizing the set of masked substitution tables to obtain a first set of values,
   iii) carrying out second cryptographic operation utilizing the set of corresponding a mask tables to obtain a second set of values, and,
   v) combining the first set of values and the second set of values to provide the masked output value.

8. The method of claim 7 wherein defining the set of masked substitution tables and the set of corresponding mask tables is carried out prior to downloading program code for carrying out the first cryptographic operation and the second cryptographic operation.

9. The method of claim 7, wherein the step of defining a corresponding mask table comprises defining a set of corresponding mask tables for that masked substitution table by:

generating random values $r_1[x], \ldots, r_{n-1}[x]$ for each address x in the substitution table and defining mask tables $M_1, \ldots, M_{n-1}$ to store, at each address x, the respective random values $r_1[x], \ldots, r_{n-1}[x]$, and defining a mask table $M_n$ by, for each address x in the mask table $M_n$, masking a fixed mask value m with the random value r[x] generated for the address x in the substitution table and with each of the random values $r_1[x], \ldots, r_{n-1}[x]$ stored at the address x in the respective mask tables $M_1, \ldots, M_{n-1}$.

10. The method of claim 9 wherein defining the set of masked substitution tables and the set of corresponding mask tables is carried out prior to downloading program code for carrying out the first cryptographic operation and the second cryptographic operation.

11. The method of claim 7 wherein the cryptographic operation is either a Data Encryption Standard (DES) encryption operation or an Advanced Encryption Standard (AES) encryption operation.

12. The method of claim 7 further comprising:
the processor dynamically regenerating each masked substitution table and each corresponding mask table by, after a predetermined number of masked substitution table entries are accessed, masking each of the accessed entries and a respective entry in each corresponding mask table with an individually generated random value.

13. A computing-device program product for implementing a method to resist power analysis attacks on a computing device by executing cryptographic steps based on a defined cryptographic process, the defined cryptographic process accepting an input, generating an output, and utilizing one or more originally-defined substitution tables, the program product comprising program code embodied in a non-transitory program product storage media for execution by a processor of the device, the program code comprising:

a) program code operative to generate a random value r[x] for each address x in the substitution table, b) program code operative to define the masked substitution table by masking a value in the substitution table, at each address x, with the random value r[x] generated for the address x, and c) program code operative to define the corresponding mask table such that a value at each address x in the corresponding mask table, when masked with the random value r[x] generated for the address x in the masked substitution table, is equal to a fixed mask value m.

14. A computing-device program product for implementing a method to resist power analysis attacks on a computing device by executing cryptographic steps based on a defined cryptographic process, the defined cryptographic process accepting an input, generating an output, and utilizing one or more originally-defined substitution tables, the program product comprising program code embodied in a non-transitory program product storage media for execution by a processor of the device, the program code comprising:

a) program code operative to generate a random value r[x] for each address x in the substitution table, b) program code operative to define the masked substitution table by masking a value in the substitution table, at each address x, with the random value r[x] generated for the address x, c) program code operative to generate random values $r_1[x], \ldots, r_{n-1}[x]$ for each address x in the substitution table and to define masked substitution tables $M_1, \ldots, M_{n-1}$ to store, at each address x, the respective random values $r_1[x], \ldots, r_{n-1}[x]$, and d) program code operative to define a mask table $M_n$ having, for each address x, an entry $r_n[x]$ defined by masking a fixed mask value m with the random value r[x] generated for the address x in the substitution table and with each of the random values $r_1[x], \ldots, r_{n-1}[x]$ stored at the address x in the respective mask tables $M_1, \ldots, M_{n-1}$.

15. A computing-device program product for implementing a method to resist power analysis attacks on a computing device by executing cryptographic steps based on a defined cryptographic process, the defined cryptographic process accepting an input, generating an output, and utilizing one or more originally-defined substitution tables, the program product comprising program code embodied in a non-transitory program product storage media for execution by a processor of the device, the program code comprising program code operative to enable the processor to:

define a set of masked substitution tables and a set of corresponding mask tables by, for each substitution table from the set of substitution tables:
(a) generating a random value r[x] for each address x in the substitution table,
(b) defining a masked substitution table by masking a value in the substitution table, at each address x, with the random value r[x] generated for the address x, and
(c) defining a corresponding mask table for the masked substitution table such that a value at each address x in the corresponding mask table, when masked with the random value r[x] generated for the address x in the masked substitution table, is equal to the fixed mask value m, carry out first cryptographic steps utilizing a set of masked substitution tables to obtain first values and carry out second cryptographic steps utilizing a set of corresponding mask tables to obtain second values, the program code operative to combine the first values and the second values to provide the masked output value.

16. The computing-device program product of claim 15 in which the program code operative to define the masked substitution tables and the corresponding mask tables is executed prior to downloading program code for carrying out the first cryptographic steps and the second cryptographic steps.

17. The computing device program product of claim 15, wherein the program code is operative to enable the processor to: define the set of masked substitution tables and the set of corresponding mask tables by, for each substitution table from the set of substitution tables:

generating random values $r_1[x], \ldots, r_{n-1}[x]$ for each address x in the substitution table and defining n-1 masked substitution tables $M_1, \ldots, M_{n-1}$ to store, at each address x, the respective random values $r_1[x], \ldots, r_{n-1}[x]$, defining a mask table $M_n$ having entries $r_n[x]$ defined by masking a fixed mask value m with the random value r[x] generated for the corresponding address x in the substitution table and with each of the random values $r_1[x], \ldots, r_{n-1}[x]$ stored at the address x in the respective mask tables $M_1, \ldots, M_{n-1}$.

18. The computing-device program product of claim 17 in which the program code operative to enable the processor to define the masked substitution tables and the corresponding mask tables is executed prior to downloading program code for carrying out the first cryptographic steps and the second cryptographic steps.

19. The computing-device program product of claim 15 wherein the cryptographic operation is either a Data Encryption Standard (DES) encryption operation, or an Advanced Encryption Standard (AES) encryption operation.

20. The computing-device program product of claim 15 further comprising program code operative to enable the processor to dynamically regenerate each masked substitution table and each corresponding mask table by, after a masked substitution table entry is accessed, redefining the accessed entry and a respective entry in the corresponding mask table by masking each of the accessed entry and the respective entry in the corresponding mask table with a randomly generated value.

21. A computing device for implementing a method to resist power analysis attacks on the computing device by executing cryptographic steps based on a defined cryptographic process, the defined cryptographic process accepting an input, generating an output, and utilizing one or more originally-defined substitution tables, the computing device including a processor in communication with a memory for executing the cryptographic operation, the device operative to:
generate random values,
store in the memory a masked substitution table, the masked substitution table defined by the processor masking a value in the substitution table at each address x with a random value r[x] generated for the address x, and
store in the memory a corresponding mask table, the corresponding mask table defined by the processor such that a value at each address x in the corresponding mask table, when masked with the corresponding value r[x] generated for the address x in the masked substitution table, is equal to the fixed mask value m.

22. The device of claim 21 wherein the cryptographic operation utilizes a plurality of substitution tables, and the device is further operative to: store in the memory a plurality of masked substitution tables and a plurality of corresponding mask tables.

23. A computing device for implementing a method to resist power analysis attacks on the computing device by executing cryptographic steps based on a defined cryptographic process, the defined cryptographic process accepting an input, generating an output, and utilizing one or more originally-defined substitution tables, the computing device including a processor in communication with a memory for executing the cryptographic operation, the device operative to:
generate random values,
store in the memory the masked substitution table for each substitution table, the masked substitution table defined by the processor masking a value in the substitution table at each address x with a random value r[x] generated for the address x,
store in the memory a plurality of corresponding mask tables $M_1, \ldots, M_{n-1}$ for each substitution table, the plurality of corresponding mask tables $M_1, \ldots, M_{n-1}$ defined by the processor to store, at each address x therein, respective random values $r_1[x], \ldots, r_{n-1}[x]$ generated for address x,
store in the memory a mask table $M_n$ for each substitution table, the mask table $M_n$ defined by the processor to store, for each address x, an entry $r_n[x]$ defined by masking a fixed mask value m with the random value r[x] generated for the address x in the substitution table and with each of the random values $r_1[x], \ldots, r_{n-1}[x]$ stored at the address x in the respective mask tables $M_1, \ldots, M_{n-1}$.

24. The device of claim 23 wherein the cryptographic operation operates using a plurality of substitution tables, and the device is further operative to store in the memory, for each of the plurality of substitution tables, the masked substitution table, the corresponding mask tables $M_1, \ldots, M_{n-1}$ and the mask table $M_n$ in the memory.

25. A computing device for implementing a method to resist power analysis attacks on the computing device by executing cryptographic steps based on a defined cryptographic process, the defined cryptographic process accepting an input, generating an output, and utilizing one or more originally-defined substitution tables, the computing device including a processor in communication with a memory for executing the cryptographic operation, the device operative to:
generate random values,
store in the memory one or more substitution tables, one or more masked substitution tables and one or more mask tables corresponding to the one or more masked substitution tables;
the processor defining the one or more masked substitution tables by storing, at each address x in the one or more masked substitution tables, the corresponding value from the one or more substitution tables masked with a random value r[x] generated for the address x,
the processor defining the one or more corresponding mask tables such that each value at address x in each of the one or more corresponding mask tables, when masked with the value r[x] generated for the address x, is equal to the fixed mask value m, and
the processor receiving the input value and carrying out a first set of cryptographic steps on the input value using the masked substitution tables to obtain first values, carrying out a second set of cryptographic steps on the input value using the one or more corresponding mask tables to obtain second values, and combining the first values and the second values to provide the masked output value.

26. A computing device for implementing a method to resist power analysis attacks on the computing device by executing cryptographic steps based on a defined cryptographic process, the defined cryptographic process accepting an input, generating an output, and utilizing one or more originally-defined substitution tables, the computing device including a processor in communication with a memory for executing the cryptographic operation, the device operative to:
generate random values,
store in the memory one or more substitution tables, one or more masked substitution tables and a plurality of mask tables corresponding to each of the one or more masked substitution tables;
the processor defining the one or more masked substitution tables by storing, at each address x in the one or more masked substitution tables, the corresponding value from one of the one or more substitution tables masked with a generated random number generated for the address x,
the processor defining the plurality of corresponding mask tables corresponding to each of the one or more masked substitution tables by, for each of the one or more masked substitution tables, storing a plurality of corresponding mask tables $M_1, \ldots, M_{n-1}$, the plurality of corresponding mask tables $M_1, \ldots, M_{n-1}$ defined to store, at each address x therein, respective random values $r_1[x], \ldots, r_{n-1}[x]$ generated for address x, and storing a mask table $M_n$, the mask table $M_n$ defined to store, at each address x, an entry $r_n[x]$ defined by masking a fixed mask value m with the random value r[x] generated for the corresponding address x in the substitution table and with each of the random values $r_1[x], \ldots, r_{n-1}[x]$ stored at the corresponding address x in the respective mask tables $M_1, \ldots, M_{n-1}$, and the processor receiving the input value and carrying out a first set of cryptographic steps on the input value using the masked substitution tables to obtain first values, carrying out a second set of cryptographic steps on the input value using the mask tables to obtain second values, and combining the first values and the second values to provide the masked output value.

* * * * *